United States Patent
Park et al.

(10) Patent No.: US 7,781,927 B2
(45) Date of Patent: Aug. 24, 2010

(54) VIBRATION MOTOR

(75) Inventors: Young Il Park, Gunpo-si (KR); Jae Jun Eom, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 381 days.

(21) Appl. No.: 11/871,724

(22) Filed: Oct. 12, 2007

(65) Prior Publication Data

US 2008/0088191 A1    Apr. 17, 2008

(30) Foreign Application Priority Data

| Oct. 13, 2006 | (KR) | ............. 10-2006-0099703 |
| Jun. 25, 2007 | (KR) | ............. 10-2007-0062387 |
| Jul. 7, 2007  | (KR) | ............. 10-2007-0068386 |
| Jul. 25, 2007 | (KR) | ............. 10-2007-0074717 |
| Aug. 6, 2007  | (KR) | ............. 10-2007-0078548 |

(51) Int. Cl.
  *H02K 7/06* (2006.01)
  *H02K 11/00* (2006.01)
  *H02K 5/00* (2006.01)
  *G11B 5/016* (2006.01)
  *G11B 17/02* (2006.01)
  *G11B 17/08* (2006.01)

(52) U.S. Cl. .............. 310/81; 310/68 R; 310/71; 310/89; 310/40 MM; 360/99.04; 360/99.08; 360/98.07

(58) Field of Classification Search ............ 310/68 R, 310/81, 40 MM, 71, 89; 360/99.04, 99.05–99.08, 360/98.07

See application file for complete search history.

(56) References Cited

U.S. PATENT DOCUMENTS

| 6,394,768 B1 * | 5/2002 | Fukuda et al. ......... 417/423.15 |
| 6,417,589 B1 * | 7/2002 | Kuyama et al. ............. 310/81 |
| 6,522,037 B2 * | 2/2003 | Lee et al. ................ 310/68 R |
| 2007/0128893 A1 * | 6/2007 | Wu et al. ................. 439/74 |

FOREIGN PATENT DOCUMENTS

FR    2697715 A1 *    5/1994

OTHER PUBLICATIONS

Machine Translation FR2697715 (1994).*

* cited by examiner

*Primary Examiner*—Quyen Leung
*Assistant Examiner*—Jose A Gonzalez Quinones
(74) *Attorney, Agent, or Firm*—Saliwanchik, Lloyd & Saliwanchik

(57) ABSTRACT

A vibration motor is provided, comprising a case having an upper case and a lower case which are coupled to each other; a shaft installed in the case while being supported by the case; a rotor rotatably coupled with the shaft; a stator arranged around the shaft; a first substrate installed on an upper surface of the lower case; and a second substrate coupled to a lower surface of the lower case and electrically connected to the first substrate. The lower case has a first opening and the first substrate is electrically connected to the second substrate through the first opening.

11 Claims, 14 Drawing Sheets

VIBRATION MOTOR

CROSS-REFERENCE TO RELATED APPLICATIONS

The present application claims the benefit under 35 U.S.C. §119 of Korean Patent Application Nos. 10-2006-0099703, filed Oct. 13, 2006, 10-2007-0062387, filed Jun. 25, 2007, 10-2007-0068386, filed Jul. 7, 2007, 10-2007-0074717, filed Jul. 25, 2007, and 10-2007-0078548, filed Aug. 6, 2007, which are hereby incorporated by reference in their entirety.

BACKGROUND

A vibration motor typically includes a rotor and a stator. The rotor may be an eccentric rotor. In operation, as power is applied to the vibration motor, the eccentric rotor rotates so that vibration is generated.

Vibration motors are applicable for various electronic appliances, such as, for example, mobile terminals, personal digital assistants (PDAs), and game players.

BRIEF SUMMARY

Embodiments of the present invention provide a vibration motor.

An embodiment provides a vibration motor, which can be easily mounted in an electronic appliance.

Another embodiment provides a vibration motor, which can be fabricated in a small size.

Yet another embodiment provides a vibration motor, which can be securely coupled with an electronic appliance.

A vibration motor according to an embodiment of the present invention comprises: a case including an upper case and a lower case which are coupled to each other; a shaft installed in the case while being supported by the case; a rotor rotatably coupled with the shaft; a stator arranged around the shaft; a first substrate installed on an upper surface of the lower case; and a second substrate coupled to a lower surface of the lower case and electrically connected to the first substrate, wherein the lower case has a first opening and the first substrate is electrically connected to the second substrate through the first opening.

In one embodiment, the vibration motor comprises a case including an upper case and a lower case which are coupled to each other; a shaft installed in the case while being supported by the case; a rotor rotatably coupled with the shaft; a stator arranged around the shaft; a first substrate installed on an upper surface of the lower case; and a second substrate accommodated in a concave portion formed in a lower surface of the lower case and electrically connected to the first substrate.

In another embodiment, the vibration motor comprises a case including an upper case and a lower case which are coupled to each other; a shaft installed in the case while being supported by the case; a rotor rotatably coupled with the shaft; a stator arranged around the shaft; and a first substrate having a first section installed on an upper surface of the lower case and a second section which protrudes between the lower and upper cases and is accommodated in a concave portion formed in a lower surface of the lower case.

DETAILED DESCRIPTION

Hereinafter, a vibration motor according to embodiments of the present invention will be described in detail with reference to accompanying drawings.

First Embodiment

Figure 1:
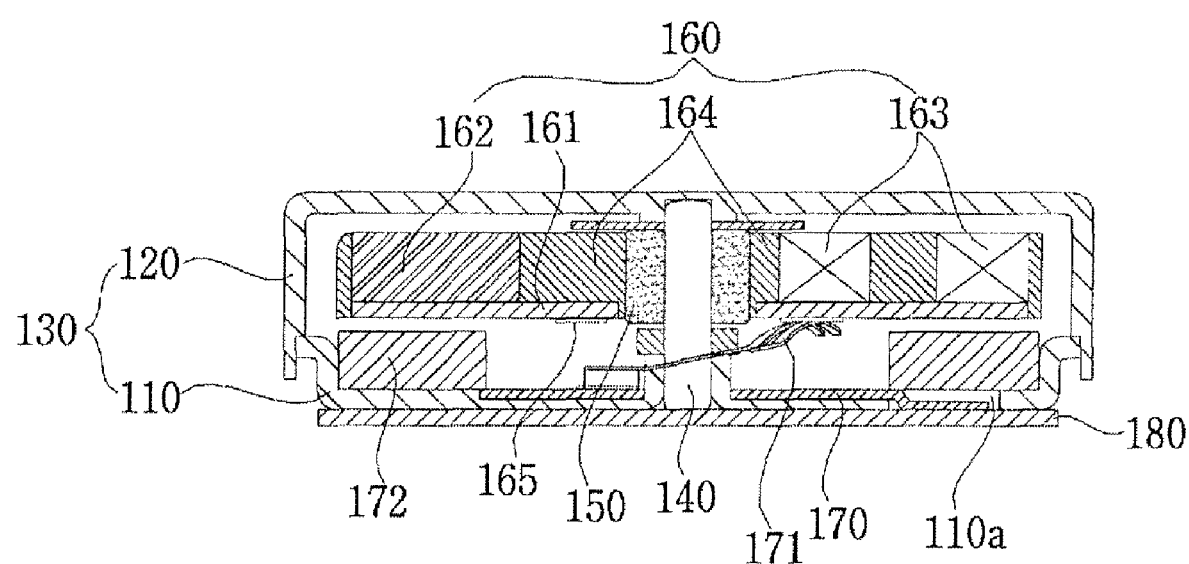
FIGS. 1 to 3 are views showing a vibration motor according to a first embodiment of the present invention.
Figure 2:
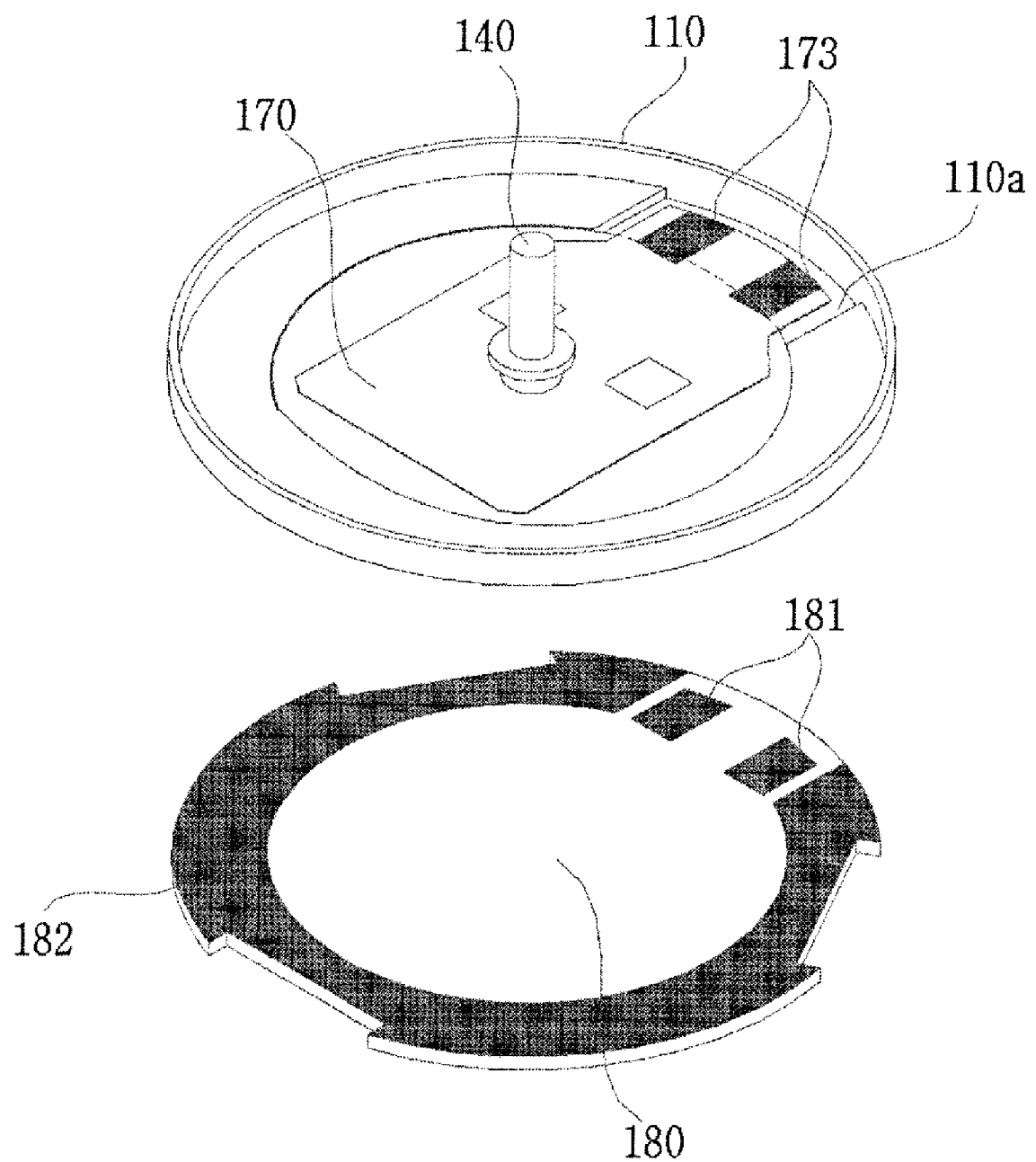
Figure 3:
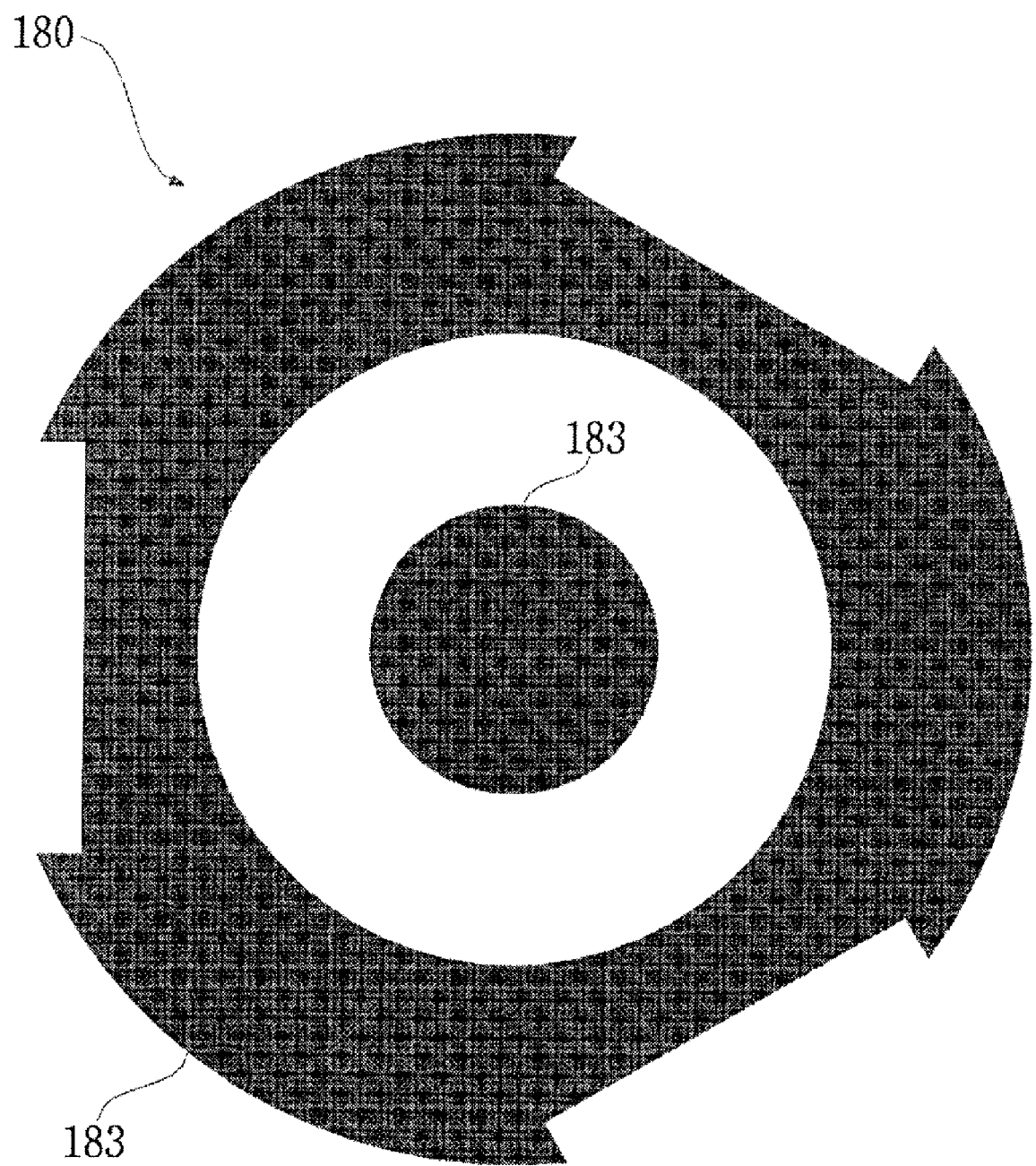

FIG. 1 is a cross-sectional view of a vibration motor according to a first embodiment, FIG. 2 is a perspective view representing a first substrate, a lower case, and a second substrate of the vibration motor shown in FIG. 1, and FIG. 3 is a bottom view of the second substrate shown in FIG. 2.

Referring to FIGS. 1 to 3, the vibration motor according to the first embodiment includes a case 130 having an upper case 120 and a lower case 110, which are coupled to each other while forming a predetermined cavity therebetween.

The upper case 120 has an upper plate and a side plate, and the lower case 110 has a lower plate and a side plate. A lower end portion of the side plate of the upper case 120 is coupled with an upper end portion of the side plate of the lower case 110. The upper plate of the upper case 120 and the lower plate of the lower case 110 constitute upper and lower plates of the case 130, respectively.

One end of a shaft 140 is supported on the upper case 120 and the other end of the shaft 140 is supported on the lower case 110.

A first substrate 170, which can be prepared in the form of an FPCB (flexible printed circuit board), is coupled to the upper surface of the lower case 110, and a ring-shaped magnet 172 is coupled to an upper peripheral portion of the lower case 110 to surround the shaft 140. The magnet 172 serves as a stator.

A bearing 150 is fitted around the shaft 140, and an eccentric rotor 160 is rotatably coupled around the bearing 150. The rotor 160 can include a rotor substrate 161, a winding coil 163 installed on an upper surface of the rotor substrate 161, a metallic weight 162 installed on the upper surface of the rotor substrate 161 to generate vibration by eccentricity, and a base 164, which can be a molding member made from synthetic resin. The base 164 integrally combines the rotor substrate 161, the coil 163 and the weight 162.

As external power is applied to the coil 163, rotational force is applied to the coil 163 due to interaction between the electric field generated from the coil 163 and the electric field generated from the magnet 172, so that the rotor 160 coupled with the coil 163 is rotated while generating vibration.

A rectifier 165 can be coupled to a lower surface of the rotor substrate 161. The rectifier 165 is electrically connected to the coil 163 through the rotor substrate 161.

A brush 171 is positioned between the rotor substrate 161 and the first substrate 170. One side of the brush 171 is electrically connected to the first substrate 170 and the other side of the brush 171 is electrically connected to the rectifier 165.

Thus, the external power can be applied to the rotor substrate 161 by way of the first substrate 170, the brush 171 and the rectifier 165.

A second substrate 180 is coupled to a lower surface of the lower case 110 such that the second substrate 180 can be electrically connected to the first substrate 170.

That is, an opening 110a can be provided in the lower case 110 and the first substrate 170 is coupled with the second substrate 180 through the opening 110a, so that the first substrate 170 is electrically connected to the second substrate 180.

The first substrate 170 can include an upper part coupled to the lower case 110, a lower part coupled to the second substrate 180, and an inclined part that interconnects the upper part and the lower part.

In this embodiment, the lower part of the first substrate 170 and the lower surface of the lower case 110 are aligned in the same horizontal plane. In addition, the inclined part and the lower part of the first substrate 170 are disposed in the opening 110a of the lower case 110 while being spaced apart from the lower case 110.

The opening 110a has an area larger than the lower part of the first substrate 170. The inclined part of the first substrate 170 brings the lower part of the first substrate 170 below the magnet 170 and spaced apart from the magnet 172 by a predetermined distance.

Referring to FIG. 2, first terminals 173 are provided on a lower surface of the lower part of the first substrate 170 such that the first terminals 173 can be electrically connected to the second substrate 180. In addition, second terminals 181 are provided on an upper surface of the second substrate 180 such that the second terminals 181 can be electrically connected to the first terminals 173.

That is, the first terminals 173 of the first substrate 170 make contact with the second terminals 181 of the second substrate 180, so that the power applied to the second substrate 180 is transferred to the first substrate 170.

In addition, as shown in FIG. 3, a third terminal 183 can be formed on a lower surface of the second substrate 180. The third terminal 183 is electrically connected to the second terminals 181 and is coupled with a substrate of an electronic appliance receiving the vibration motor, so that the third terminal 183 is electrically connected to the electronic appliance.

Thus, the power of the electronic appliance can be applied to the coil 163 by way of the third terminal 183 of the second substrate 180, the second terminals 181 of the second substrate 180, the first terminals 173 of the first substrate 170, the brush 171, the rectifier 165, and the rotor substrate 161.

The first terminal 173, the second terminal 181, and the third terminal 183 are designed such that positive (+) and negative (-) power can be applied thereto. According to an embodiment, the first substrate 170, the second substrate 180 and the rotor substrate 161 are provided with vias filled with conductive materials and a circuit pattern in such a manner that the positive (+) and negative (-) power can be separately applied thereto.

In addition, a bonding section 182 can be formed on the upper surface of the second substrate for the purpose of soldering or bonding between the second substrate 180 and the lower case 110. The second substrate 180 has a size smaller than that of the lower case 110.

According to the vibration motor of the first embodiment, the second substrate 180 is a hard substrate and is coupled to the lower surface of the lower case 110, so that the vibration motor can be easily mounted in the electronic appliance. In addition, the vibration motor can be installed in the electronic appliance through an automation process.

In the vibration motor according to the first embodiment, the third terminal 183 of the second substrate 180 has a circular-shaped negative (-) terminal and a ring-shaped positive (+) terminal that surrounds the negative (-) terminal while being spaced apart from the negative (-) terminal, so that the third terminal 183 can be connected to a power terminal of the electronic appliance. Thus, electric connection can be easily achieved regardless of the installation direction of the vibration motor on the substrate of the electronic appliance.

In addition, according to the vibration motor of the first embodiment, since the first and second substrates 170 and 180 have the size smaller than that of the lower case 110, it is possible to reduce the installation space for the vibration motor in the electronic appliance.

Further, according to the vibration motor of the first embodiment, the first substrate 170 is electrically connected to the second substrate 180 by passing through the lower plate of the lower case 110, so that the size of the vibration motor can be minimized.

Second Embodiment

Figure 4:
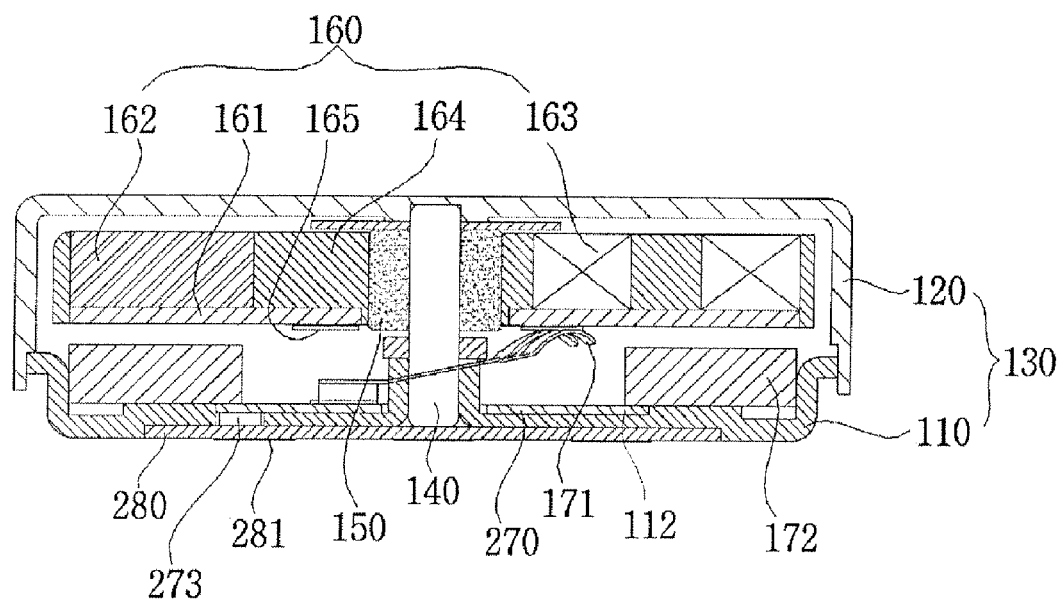
FIGS. 4 to 6 are views showing a vibration motor according to a second embodiment of the present invention.
Figure 5:
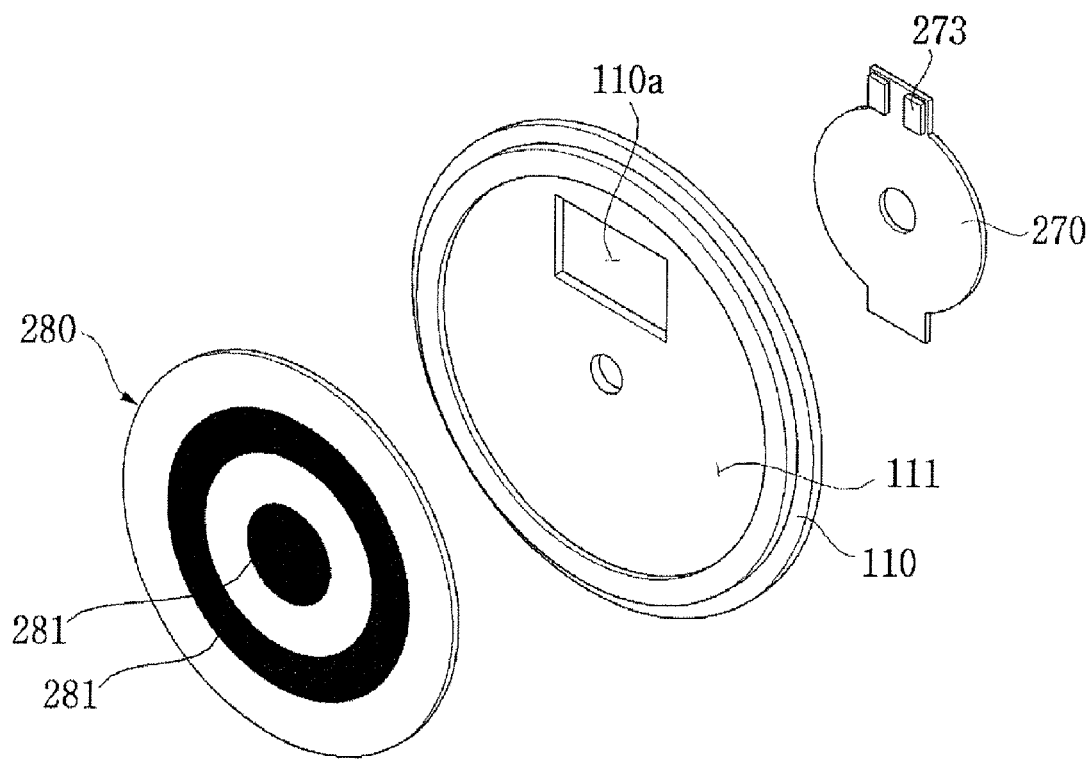
Figure 6:
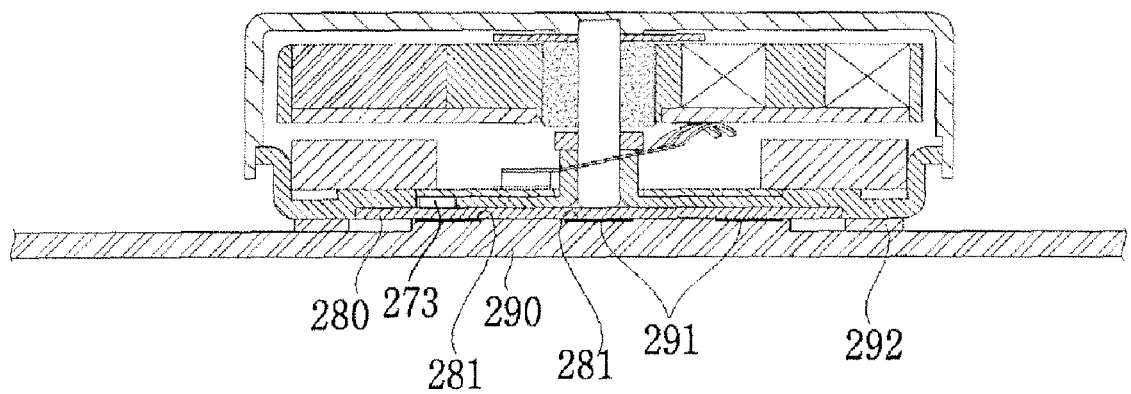

FIG. 4 is a cross-sectional view of a vibration motor according to a second embodiment, FIG. 5 is a perspective view representing a first substrate, a lower case, and a second substrate of the vibration motor shown in FIG. 4, and FIG. 6 is a cross-sectional view showing a vibration motor installed on a substrate of an electronic appliance according to the second embodiment.

The following description of the second embodiment will be focused on the differences relative to the above-mentioned first embodiment.

Referring to FIG. 4, a First substrate 270 is mounted on an upper surface of a lower case 110 and a second substrate 280 is mounted on a lower surface of the lower case 110.

An upper surface of the first substrate 270 is aligned in the same horizontal plane with an upper surface of a part of the lower case 110. That is, a first concave portion 112 is provided in an upper surface of a lower plate of the lower case 110 and the first substrate 270 is fixedly accommodated in the first concave portion 112.

The lower and side surfaces of the first substrate 270 make contact with the lower case 110 while being surrounded by the lower case 110.

Accordingly, the thickness of the vibration motor can be reduced by the thickness of the first substrate 270 and the first substrate 270 can be securely coupled to the lower case 110.

The lower surface of the second substrate 280 is aligned in the same horizontal plate with a lower surface of a part of the lower plate of the lower case 110. That is, a second concave portion 111 is provided in the lower surface of the lower plate of the lower case 110 and the second substrate 280 is accommodated in the second concave portion 111.

The second substrate 280 has a size smaller than that of the lower case 110. In addition, the upper and side surfaces of the second substrate 280 make contact with the lower case 110 while being surrounded by the lower case 110.

Accordingly, the thickness of the vibration motor can be reduced by the thickness of the second substrate 280 and the second substrate 280 can be securely coupled to the lower case 110.

In addition, since the lower surface of the second substrate is aligned in the same horizontal plane with the lower surface of the part of the lower plate of the lower case 110, the second substrate 280 can be electrically connected to a substrate 290 of an electronic appliance and the lower surface of the lower case 210 can be coupled to the substrate 290 of the electronic appliance.

FIG. 6 shows a power terminal 291, which is formed on a substrate 290 of the electronic appliance for the purpose of electric connection relative to a third terminal 281 of the second substrate 280. As shown in FIG. 6, the lower case 110 can be coupled to the substrate 290 of the electronic appliance by means of a bonding member 292. For instance, the bonding member 292 may include a soldering material or an adhesive.

Meanwhile, the first substrate 270 is electrically connected to the second substrate 280 through a conductive member 273. The conductive member 273 is disposed in an opening 110a provided in the lower case 110.

The conductive member 273 may include two metallic members such that positive (+) power and negative (−) power can be separately applied to the conductive member 273. The conductive member 273 is spaced apart from a side surface of the lower case 110 that defines the opening 110a.

FIG. 5 illustrates a conductive member 273 attached to the first substrate 270. However, in other embodiments, the conductive member 273 can also be attached to the second substrate 280.

The third terminal 281 of the second substrate 280 includes a circular-shaped negative (−) terminal and a ring-shaped positive (+) terminal, which is spaced apart from the circular-shaped negative (−) terminal and surrounds the circular-shaped negative (−) terminal, so that the third terminal 281 of the second substrate 280 can be coupled to the power terminal 291 of the electronic appliance.

Thus, electric connection can be easily achieved regardless of the installation direction of the vibration motor on the substrate 290 of the electronic appliance.

According to the vibration motor of the second embodiment, the lower case 110 is directly coupled to the substrate 290 of the electronic appliance so that the vibration motor can be securely installed in the electronic appliance and vibration generated from the vibration motor can be effectively transferred to the electronic appliance.

In addition, according to the vibration motor of the second embodiment, the first and second substrates 270 and 280 are accommodated in the first and second concave portions 112 and 111 formed in the lower case 210, respectively, so that the thickness of the vibration motor can be reduced.

Further, according to the vibration motor of the second embodiment, the second substrate 280 has a size smaller than that of the lower case 110, so that the installation space for the vibration motor in the electronic appliance can be reduced.

In addition, according to the vibration motor of the second embodiment, the first substrate 270 is electrically connected to the second substrate 280 through an aperture in the lower plate of the lower case 110, so that the size of the vibration motor can be minimized.

Third Embodiment

FIGS. 7 to 11 are views showing a vibration motor according to a third embodiment.

Figure 7:
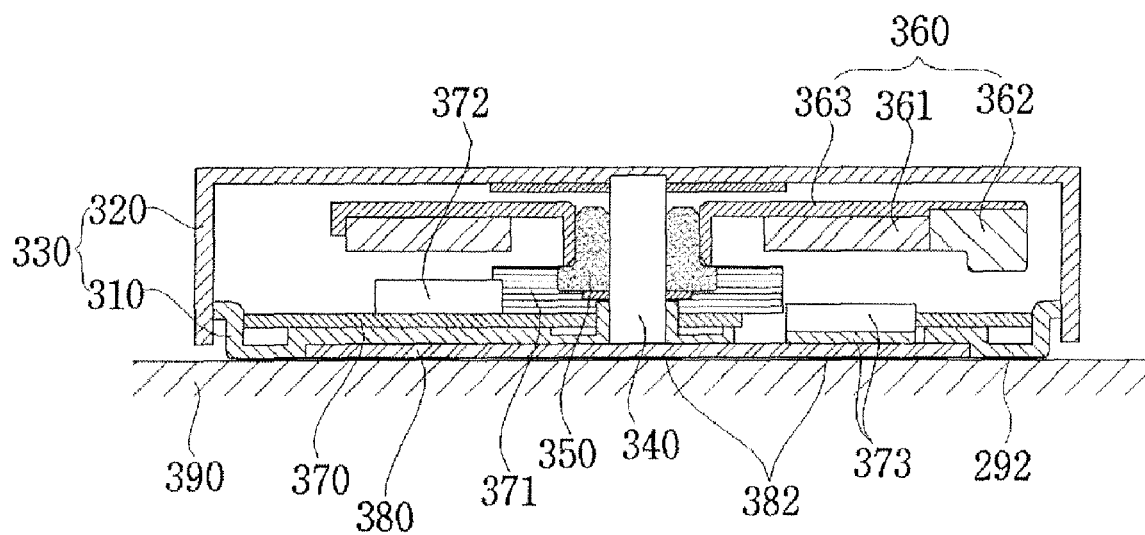
FIGS. 7 to 11 are views showing a vibration motor according to a third embodiment of the present invention.
Figure 8:
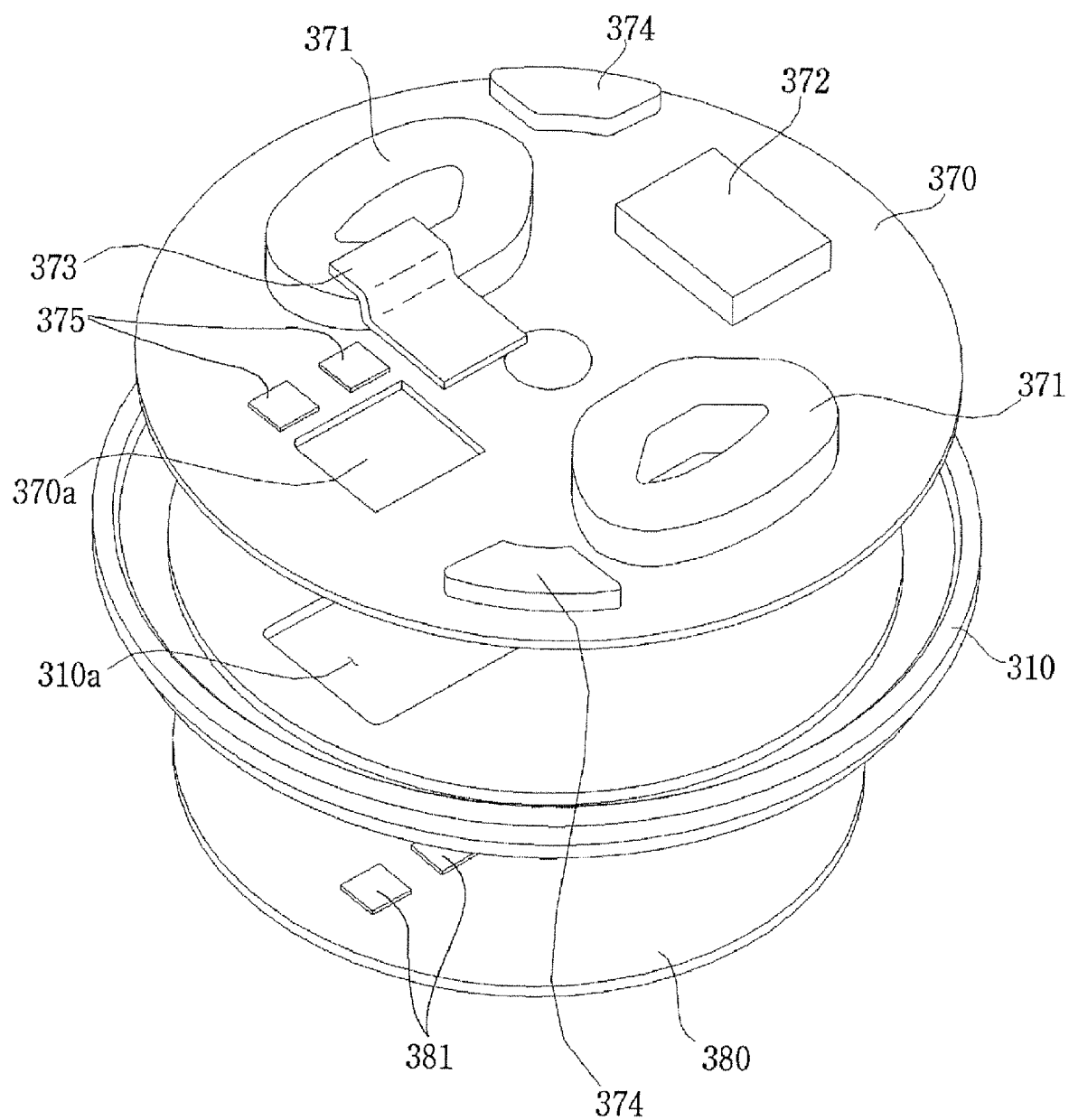
Figure 9:
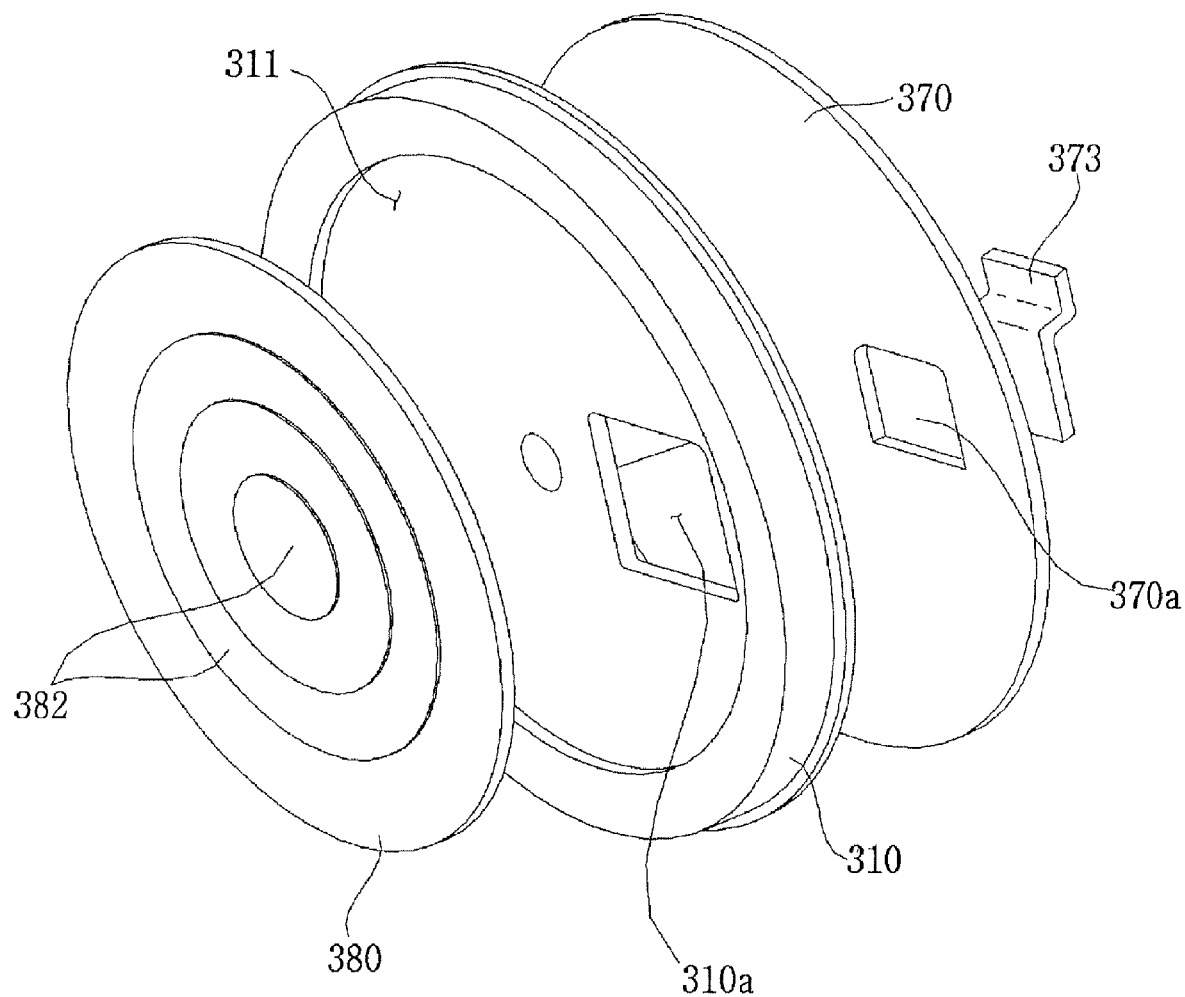

FIG. 7 is a cross-sectional view of a vibration motor according to the third embodiment, and FIGS. 8 and 9 are exploded perspective views representing a first substrate, a lower case, and a second substrate of the vibration motor shown in FIG. 7.

Referring to FIGS. 7 to 9, the vibration motor according to the third embodiment includes a case 330 having an upper case 320 and a lower case 310, which are coupled to each other while forming a predetermined cavity therebetween.

The upper case 320 has an upper plate and a side plate, and the lower case 310 has a lower plate and a side plate. A lower end portion of the side plate of the upper case 320 is coupled with an upper end portion of the side plate of the lower case 310. The upper plate of the upper case 320 and the lower plate of the lower case 310 constitute upper and lower plates of the case 330, respectively.

One end of a shaft 340 is supported on the upper case 320 and the other end of the shaft 340 is supported on the lower case 310. A bearing 350 is fitted around the shaft 340.

An eccentric rotor 360 is rotatably coupled around the bearing 350 to generate vibration.

The rotor 360 can include a magnet 361, a metallic weight 362 for generating vibration by eccentricity, and a rotor yoke 363 for fixing the magnet 361 and the weight 362.

A first substrate 370 is fixed to the upper surface of the lower case 310, and a coil 371 is installed on the upper surface of the first substrate 370. The coil 371 serves as a stator.

A second substrate 380 is mounted on a lower surface of the lower case 310 in such a manner that the second substrate 380 can be electrically connected to the first substrate 370. The second substrate 380 can be electrically connected to a substrate 390 of an electronic appliance.

The second substrate 380 can be soldered to the substrate 390 of the electronic appliance through a reflow process. A third terminal 382 is provided on the lower surface of the second substrate 380 such that the third terminal 382 can be electrically connected to the substrate 390 of the electronic appliance.

Thus, as the power of the electronic appliance is applied to the coil 371 through the second substrate 380 and the first substrate 370, an electric field is generated between the coil 371 and the magnet 361, so that the rotor 360 is rotated while generating vibration.

The lower case 310 has an opening 310a and the first substrate 370 has an opening 370 that faces the opening 310a. A conductive member 373 is disposed in the openings 310a and 370a. The conductive member 373 can be coupled to both the first and second substrates 370 and 380 in order to electrically connect the first substrate 370 to the second substrate 380.

Referring to FIG. 8, first terminals 375 can be installed on the first substrate 370 and second terminals 381 can be installed on the second substrate 380. In addition, the first terminals 375 can be electrically connected to the second terminals 381 by the conductive member 373.

For instance, the conductive member 373 can include a FPCB (flexible printed circuit board).

The opening 370a provided in the first substrate 370 can be smaller than the opening 310a provided in the lower case 310, and the opening 370a of the first substrate 370 is positioned above the opening 310 of the lower case 310.

The difference in the sizes of the openings 370a and 310a inhibit the lower case 310 from being electrically connected to the first substrate 370 by soldering materials when the conductive member 373 is soldered to the first substrate 370.

The lower surface of the second substrate 380 can be aligned in the same horizontal plane with a lower surface of a part of a lower plate of the lower case 310. In addition, the side and upper surfaces of the second substrate 380 make contact with the lower case 310 while being surrounded by the lower case 310.

That is, a second concave portion 311 is provided in the lower surface of the lower plate of the lower case and the second substrate 380 can be fixedly accommodated in the second concave portion 311.

Thus, the thickness of the vibration motor can be reduced by the thickness of the second substrate 380 and the second substrate 380 can be securely coupled to the lower case 310.

In addition, since the lower surface of the second substrate 380 is aligned in the same horizontal plane with the lower surface of the part of the lower plate of the lower case 310, the second substrate 380 is electrically connected to the substrate 390 of the electronic appliance and the lower surface of the lower case 310 can be coupled to the substrate 390 of the electronic appliance.

In FIG. 8, reference numerals 374 and 372 represent a cogging plate and a control chip, respectively.

Figure 10:
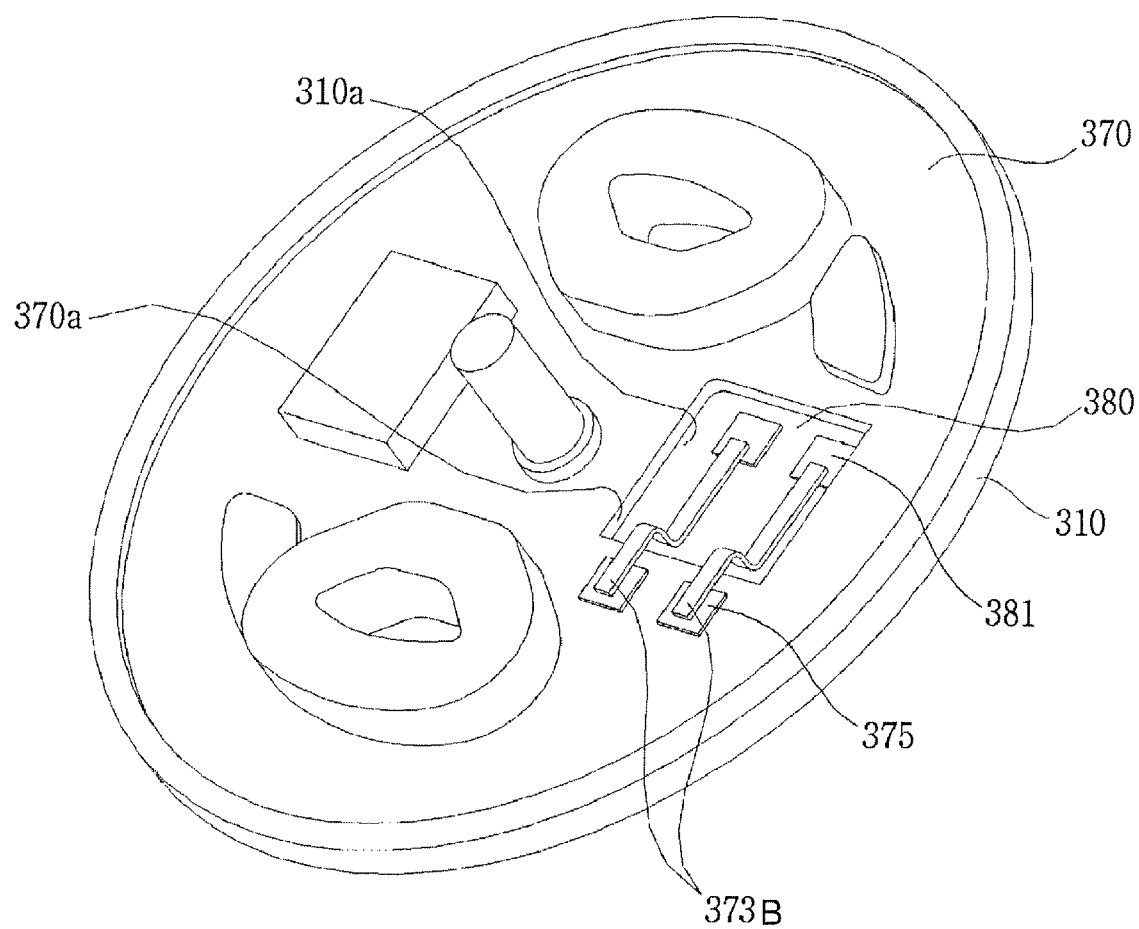
Figure 11:
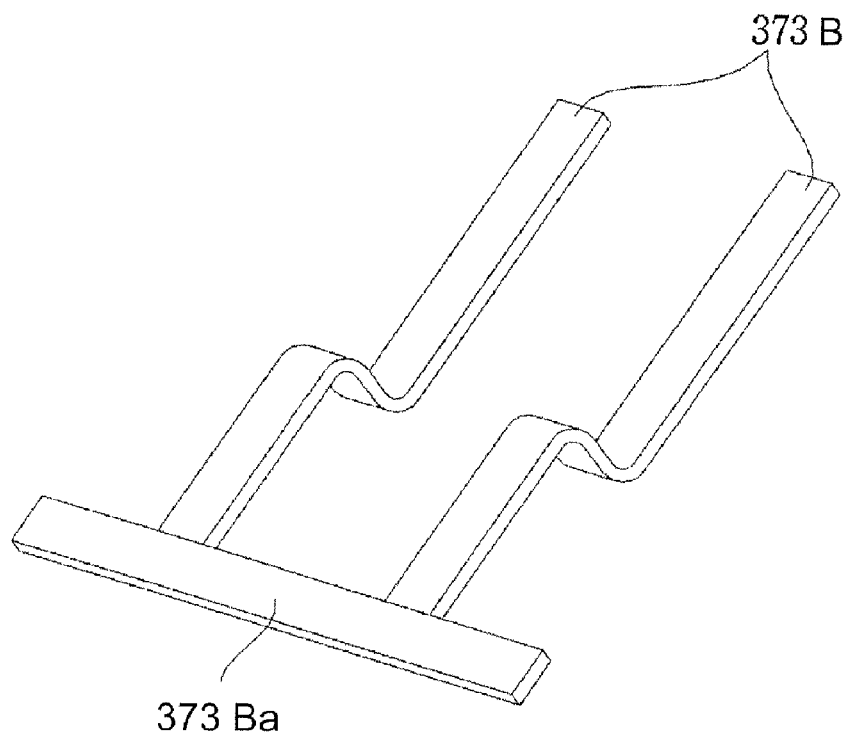

FIGS. 10 and 11 show a conductive member for electrically connecting the first substrate to the second substrate according to another embodiment.

The conductive member 373 shown in FIGS. 7 to 9 can be prepared as a FPCB having a circuit pattern therein such that positive (+) power and negative (−) power can be separately applied to the conductive member 373. However, the conductive member 373B shown in FIGS. 10 and 11 employs two FPCBs or two metallic members such that positive (+) power and negative (−) power can be separately applied to the conductive member 373B.

A connection piece 373Ba can be provided at an end portion of the conductive member 373B soldered to the first substrate 370 in order to integrally connect the two FPCBs or the two metallic members to each other.

After soldering the FPCBs or the metallic members, which are integrally connected to each other by the connection piece 373Ba, to the first and second substrates 370 and 380, the connection piece 373Ba can be cut, so that positive (+) power and negative (−) power can be separately applied in a state in which the first substrate 370 is electrically connected to the second substrate 380.

The connection piece 373Ba allows the conductive member 373 to be easily soldered to the first and second substrates 370 and 380.

According to the vibration motor of the third embodiment, the lower case 310 is directly coupled to the substrate 390 of the electronic appliance, so that the vibration motor can be securely installed in the electronic appliance and vibration generated from the vibration motor can be effectively transferred to the electronic appliance.

In addition, according to the vibration motor of the third embodiment, the second substrate 380 is fixedly accommodated in the second concave portion 311 formed in the lower case, so that the thickness of the vibration motor can be reduced.

Further, according to the vibration motor of the third embodiment, the second substrate 380 has a size smaller than that of the lower case 310, so that the installation space for the vibration motor in the electronic appliance can be reduced.

In addition, according to the vibration motor of the third embodiment, the first substrate 370 is electrically connected to the second substrate 380 through the lower plate of the lower case 310, so that the size of the vibration motor can be minimized.

Fourth Embodiment

Figure 12:
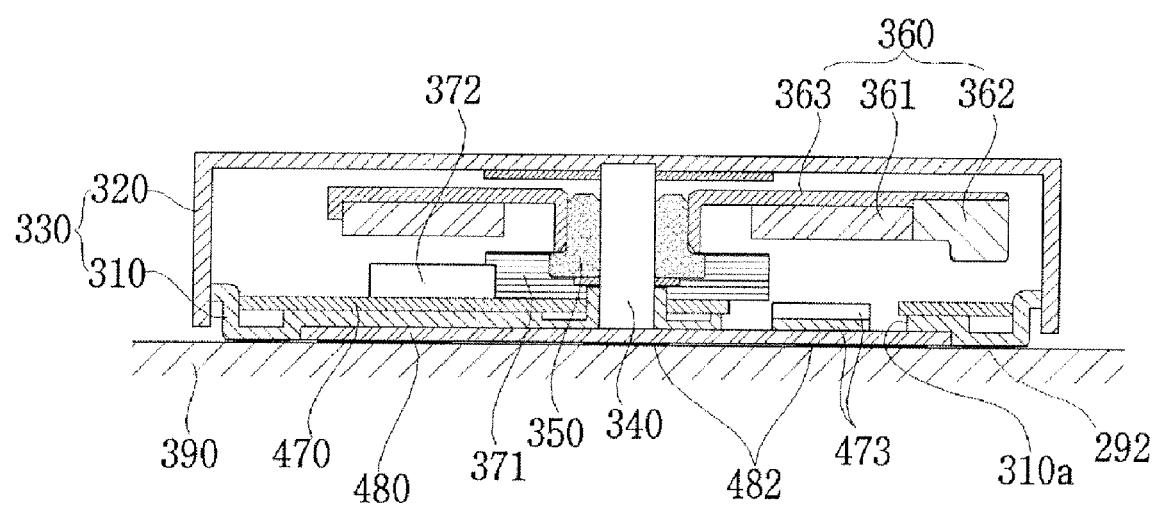
FIGS. 12 to 14 are views showing a vibration motor according to a fourth embodiment of the present invention.
Figure 13:
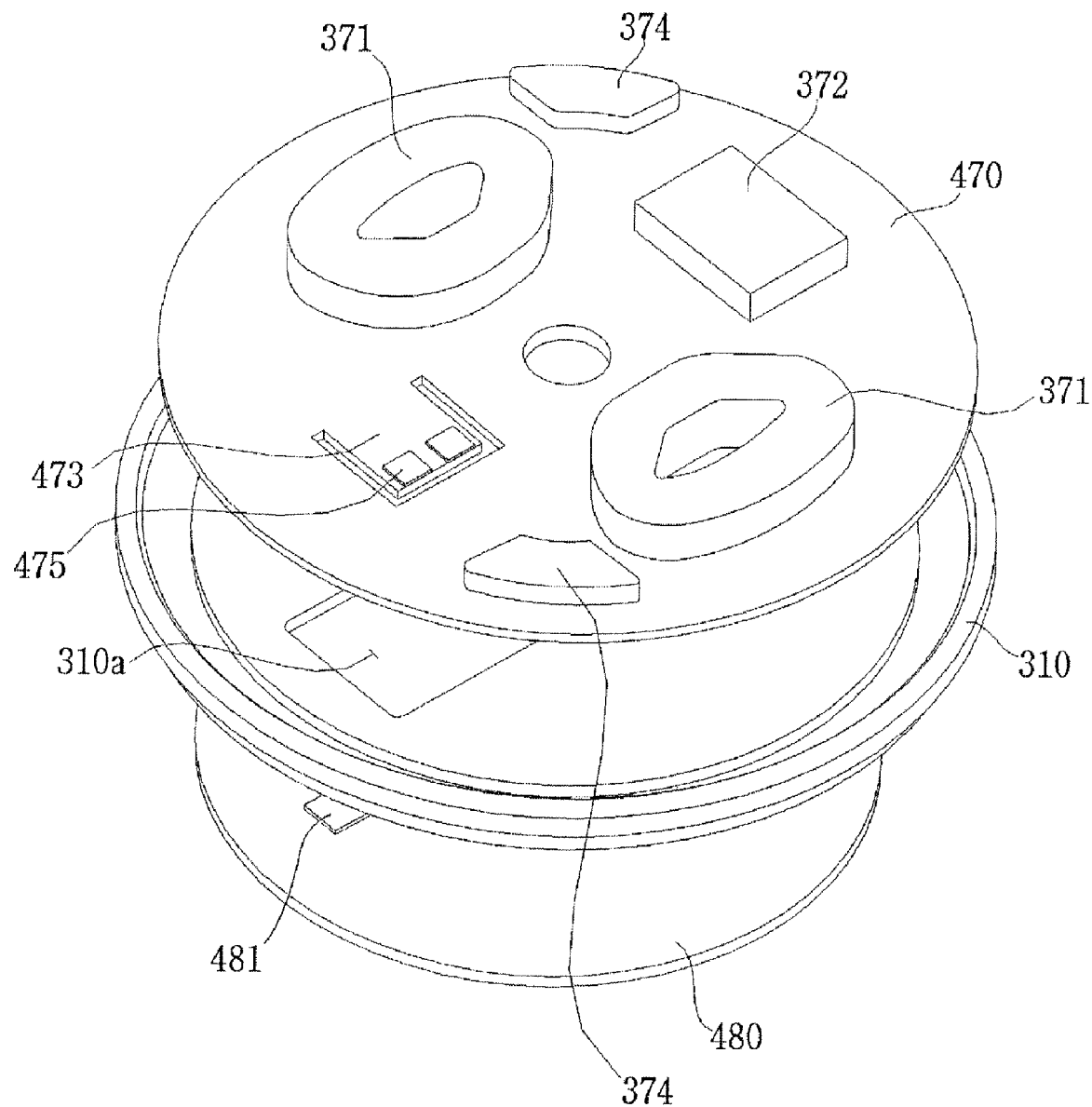
Figure 14:
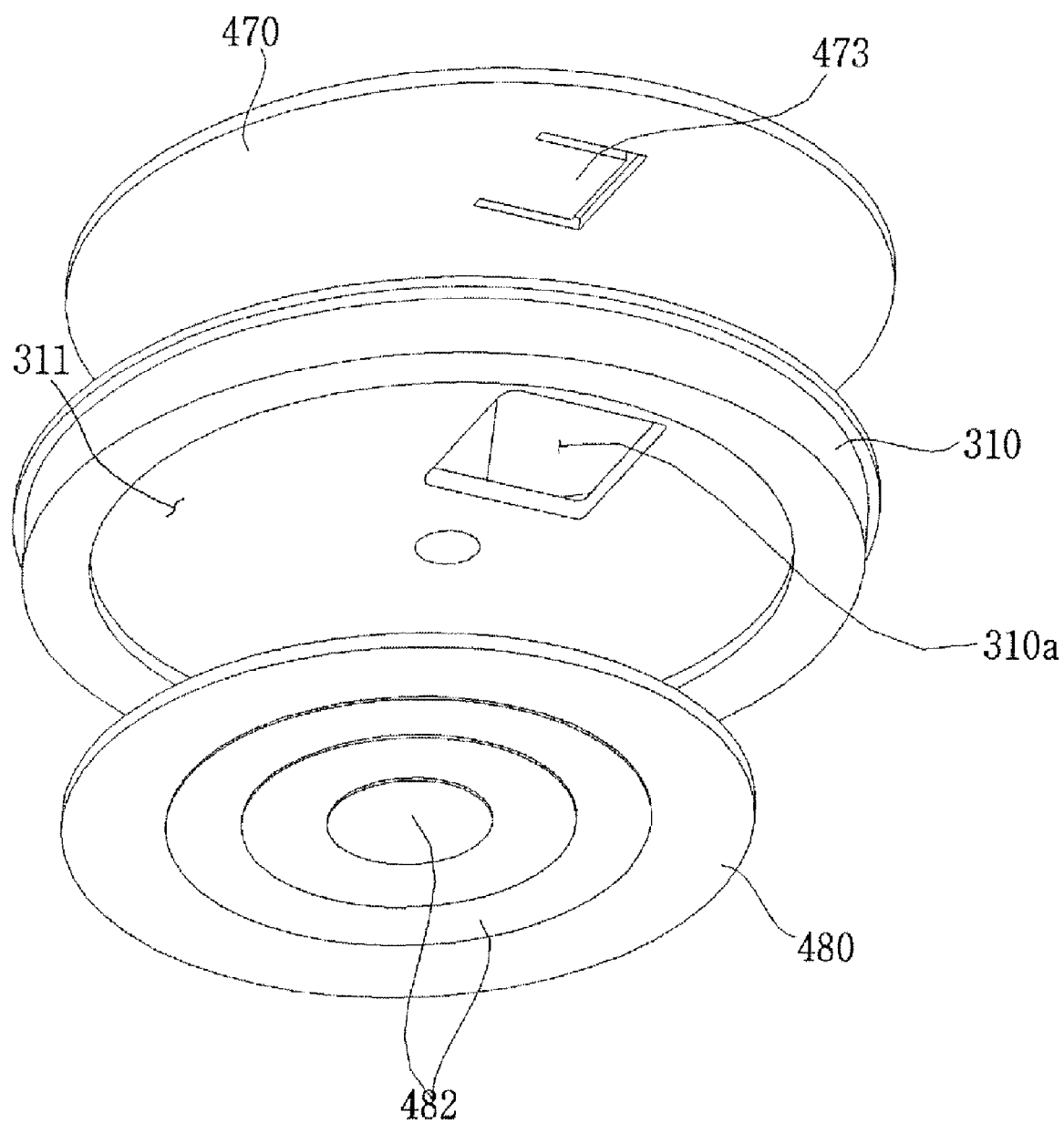

FIG. 12 is a cross-sectional view of a vibration motor according to a fourth embodiment, and FIGS. 13 and 14 are exploded perspective views representing a first substrate, a lower case, and a second substrate of the vibrational motor shown in FIG. 12.

The following description of the fourth embodiment will be focused on the differences relative to the above-mentioned third embodiment.

Referring to FIGS. 12 to 14, a first substrate 470 is fixedly mounted on an upper surface of a lower case 310 and a coil 370 can be installed on the first substrate 470.

A second substrate 480 is mounted on a lower surface of the lower case 310 in such a manner that the second substrate 480 can be electrically connected to the first substrate 470. The second substrate 480 can be soldered to a substrate 390 of an electronic appliance through, for example, a reflow process, so that the second substrate 480 is electrically connected to the substrate 390 of the electronic appliance.

A third terminal 482 soldered to the substrate 390 of the electronic appliance is provided on the lower surface of the second substrate 480.

An opening 310a is provided in the lower case 310 and a part of the first substrate 470 is coupled to the second substrate 480 through the opening 310a, so that the first substrate 470 is electrically connected to the second substrate 480.

A connection piece 473 can be formed at a predetermined portion of the first substrate 470 by partially cutting the predetermined portion of the first substrate 470 in a substantially U-shape. The connection piece 473 is bent downward and can be soldered to the second substrate 480 through the opening 310a.

A first terminal 475 is provided on the connection piece 473 and a second terminal 481 is provided on the second substrate 480 in such a manner that the second terminal 481 can be electrically connected to the first terminal 475. That is, the first terminal 475 can be connected to the second terminal 481 through a soldering process, so that the first substrate 470 is electrically connected to the second substrate 480.

An upper surface of the first substrate 470 within the substantially U-shape cut is bent under and makes contact with an upper surface of the second substrate 480.

A second concave portion 311 is formed in the lower surface of the lower case 310 and the second substrate 480 is fixedly accommodated in the second concave portion 311. Side and upper surfaces of the second substrate 480 make contact with the lower case 310 while being surrounded by the lower case 310.

A lower surface of a part of a lower plate of the lower case 310 is aligned in the same horizontal plane with the lower surface of the second substrate 480.

In addition, a lower surface of a side plate of the upper case 320 aligned in the same horizontal plane with a lower surface of a part of a lower plate of the lower case 310 and a lower surface of the second substrate 480.

According to the vibration motor of the fourth embodiment, the lower case 310 is directly coupled to the substrate 390 of the electronic appliance, so that the vibration motor can be securely installed in the electronic appliance and vibration generated from the vibration motor can be effectively transferred to the electronic appliance.

In addition, according to the vibration motor of the fourth embodiment, the second substrate 480 is fixedly accommodated in the second concave portion 311 formed in the lower case 310, so that the thickness of the vibration motor can be reduced.

Further, according to the vibration motor of the fourth embodiment, the second substrate 480 has a size smaller than that of the lower case 310, so that the installation space for the vibration motor in the electronic appliance can be reduced.

In addition, according to the vibration motor of the fourth embodiment, the first substrate 470 is electrically connected to the second substrate 480 through the lower plate of the lower case 310, so that the size of the vibration motor can be minimized.

Fifth Embodiment

Figure 15:
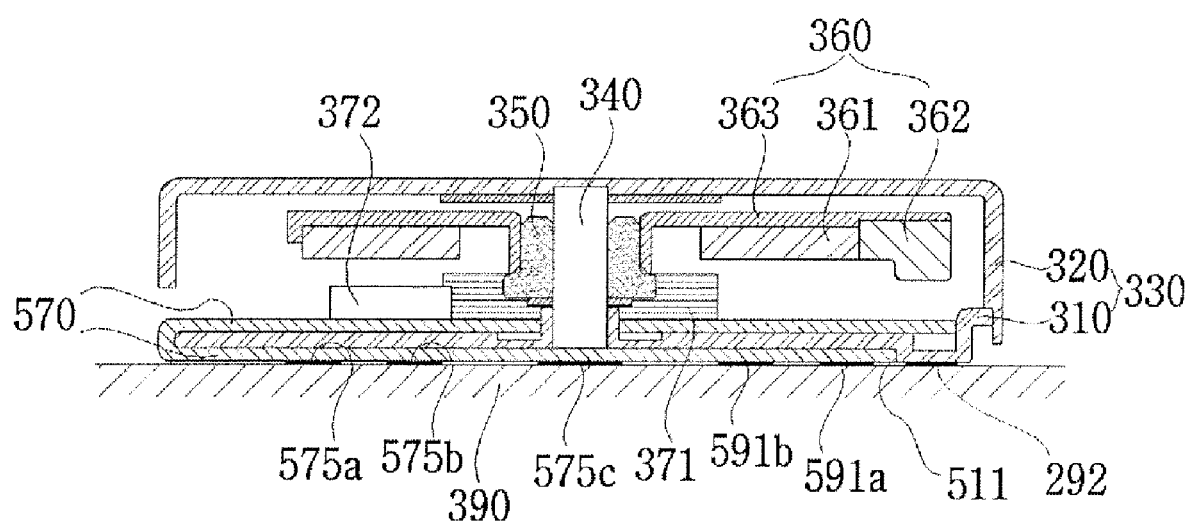
FIGS. 15 to 17 are views showing a vibration motor according to a fifth embodiment of the present invention.
Figure 16:
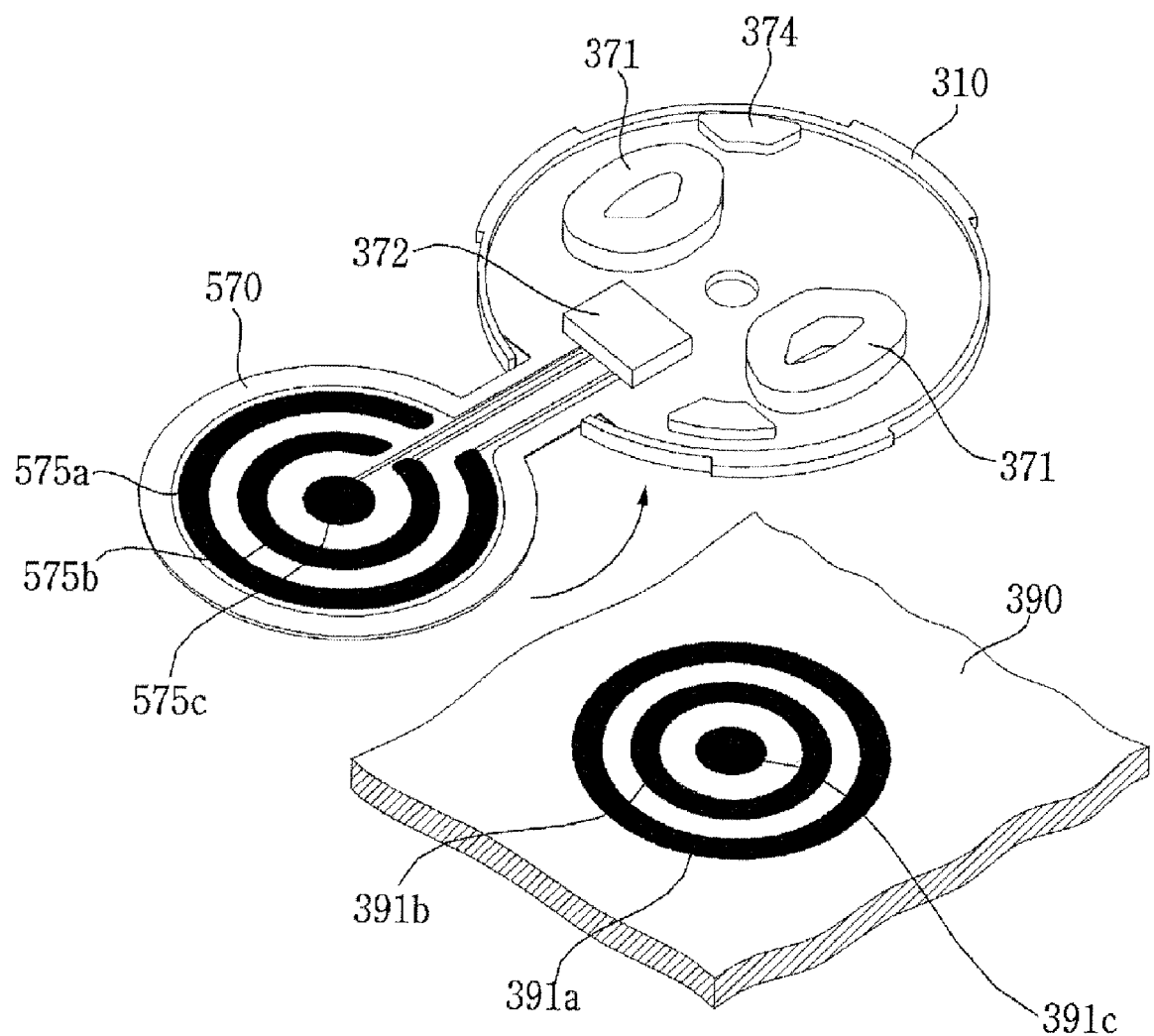
Figure 17:
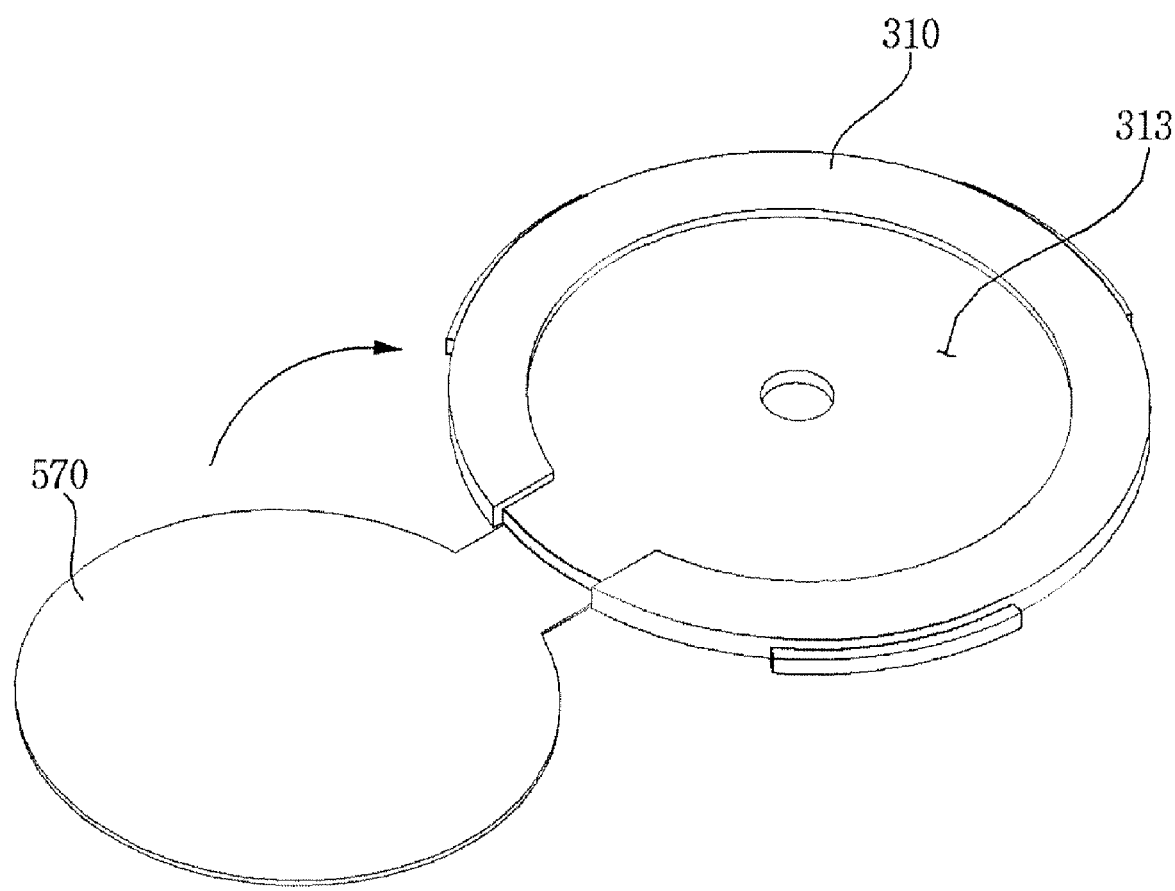

FIG. 15 is a cross-sectional view of a vibration motor according to a fifth embodiment, FIG. 16 is a perspective view representing a first substrate, a lower case, and a substrate of an electronic appliance of the embodiment shown FIG. 15, and FIG. 17 is a perspective view representing the bottom of the first substrate and the lower case shown in FIG. 16.

The following description of the fifth embodiment will be focused on the differences relative to the above-mentioned third embodiment.

Referring to FIGS. 15 to 17, the vibration motor according to the fifth embodiment includes a case 330 having an upper case 320 and a lower case 310, which are coupled to each other while forming a predetermined cavity therebetween.

A first substrate 570 is fixedly mounted on an upper surface of the lower case 310 and a part of the first substrate 570 extends to the exterior through the cavity formed between the lower case 310 and the upper case 320.

A part of the first substrate 570 is bent to fold around a side and lower surface of the lower case 310, and is fixedly accommodated in a first concave portion 313 formed in a lower surface of the lower case 310. Thus, the bent part of the first substrate 570 can be securely coupled to the lower surface of the lower case 310.

The bent part of the first substrate 570 and a lower surface of a part of the lower case 310 are aligned in the same horizontal plane. In addition, the bent part of the first substrate 570 makes contact with lower and side surfaces of the lower case 310 while being surrounded by the lower and side surfaces of the lower case 310.

The lower case 310 and the bent part of the first substrate 570 on the lower surface of the lower case 310 are coupled with the substrate 390 of the electronic appliance. Thus, vibration generated from the vibration motor can be effectively transferred to the electronic appliance.

A plurality of terminals 575a, 575b and 575c can be provided on the first substrate 570. The terminals 575a, 575b and 575c are soldered to power terminals 391a, 391b and 391c provided on the substrate 390 of the electronic appliance, so that the first substrate 570 is electrically connected to the substrate 390 of the electronic appliance.

A coil 371 that serves as a stator is installed on the portion of the first substrate 570 on the upper surface of the lower case 310. As power is supplied to the coil 371 from the substrate 390 of the electronic appliance through the first substrate 570, electromagnetic force is generated between the coil 371 and the magnet 361, so that the rotor 360 is rotated by the electromagnetic force while generating vibration.

According to the vibration motor of the fifth embodiment, a positive (+) terminal 575a and a negative (−) terminal 575b are provided on the first substrate 570. The positive (+) terminal 575a and the negative (−) terminal 575b have ring shapes with different diameters and are electrically separated from each other. In addition, a part of the first substrate is bent and is securely accommodated in the first concave portion 313 of the lower case 310. In this state, the positive (+) terminal 575a and the negative (−) terminal 575b face the substrate 390 of the electronic appliance.

In addition, a positive (+) terminal 391a and a negative (−) terminal 391b are provided on the substrate 390 of the electronic appliance in correspondence with the positive (+) terminal 575a and the negative (−) terminal 575b of the first substrate 570. The positive (+) terminal 575a and the negative (−) terminal 575b are soldered to the positive (+) terminal 391a and the negative (−) terminal 391b, so that the first substrate 570 is electrically connected to the substrate 390 of the electronic appliance.

Since the positive (+) terminal 575a and the negative (−) terminal 575b of the first substrate 570 and the positive (+) terminal 391a and the negative (−) terminal 391b of the substrate 390 of the electronic appliance have ring shapes, electric connection can be achieved regardless of the installation direction of the vibration motor.

Meanwhile, if the external power supplied to the coil 371 is shut off, the rotor 360 should stop its rotation. However, the rotor 360 may continuously rotate due to inertia even if the external power is shut off.

The rotation time of the rotor 360, after the external power supplied to the coil 371 has been shut off, is referred to as "falling time." According to the vibration motor of the fifth embodiment, a control terminal 575c is provided on the first substrate 570 in order to shorten the falling time. In the same manner, a control terminal 391c is provided on the substrate 390 of the electronic appliance corresponding to the first substrate 570.

When the power supplied to the coil 371 is shut off, a signal is applied to the control terminal 575c to urge the rotor 360 in the direction opposite to the rotational direction of the rotor 360. Thus, the falling time can be shortened.

According to the vibration motor of the fifth embodiment, the lower case 310 is directly coupled to the substrate 390 of the electronic appliance, so that the vibration motor can be securely installed in the electronic appliance and vibration generated from the vibration motor can be effectively transferred to the electronic appliance.

In addition, according to the vibration motor of the fifth embodiment, a part of the first substrate 570 is fixedly accommodated in the first concave portion 313 formed in the lower case 310, so that the thickness of the vibration motor can be reduced.

Further, according to the vibration motor of the fifth embodiment, the first substrate 570 coupled on the lower surface of the lower case 310 has a size smaller than that of the lower case 310, so that the installation space for the vibration motor in the electronic appliance can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vibration motor comprising:
a case including an upper case and a lower case which are coupled to each other;
a shaft in the case while being supported by the case;
a rotor rotatably coupled with the shaft;
a stator arranged around the shaft;
a first substrate on an upper surface of the lower case; and
a second substrate coupled to a lower surface of the lower case and electrically connected to the first substrate,
wherein the lower case has a first opening and the first substrate is electrically connected to the second substrate through the first opening.

2. The vibration motor according to claim 1, wherein a part of the first substrate makes contact with the second substrate through the first opening.

3. The vibration motor according to claim 1, wherein the first substrate comprises an upper part, a lower part, and an inclined part that interconnects the upper part and the lower part, in which the upper part is coupled to the upper surface of the lower case and the lower part is coupled to an upper surface of the second substrate.

4. The vibration motor according to claim 3, wherein the lower part and the inclined part are spaced apart from a side surface of the lower case that defines the first opening.

5. The vibration motor according to claim 3, wherein the lower part comprises a first terminal provided on a lower surface thereof, and wherein the second substrate comprises a second terminal provided on the upper surface thereof, wherein the second terminal is electrically connected to the first terminal.

6. The vibration motor according to claim 3, wherein the second substrate comprises a third terminal provided on a lower surface thereof, wherein the third terminal is electrically connected to a substrate of an electronic appliance.

7. The vibration motor according to claim 6, wherein the third terminal comprises a circular-shaped terminal and a ring-shaped terminal that surrounds the circular-shaped terminal while being spaced apart from the circular-shaped terminal.

8. The vibration motor according to claim 1, wherein the rotor includes a rotor substrate, a winding coil on an upper surface of the rotor substrate, a metallic weight on the upper surface of the rotor substrate to generate vibration by eccentricity, and a base configured to integrally combine the rotor substrate, the coil and the weight.

9. The vibration motor according to claim 8, wherein the rotor further including a rectifier coupled to a lower surface of the rotor substrate.

10. The vibration motor according to claim 9, further comprising a brush configured to electrically connect the first substrate and the rectifier.

11. The vibration motor according to claim 1, wherein the second substrate has a size smaller than a size of the lower case and wherein the second substrate includes a bonding section to be coupled to the lower case.

* * * * *